(12) United States Patent
Takeshita et al.

(10) Patent No.: US 8,905,415 B2
(45) Date of Patent: Dec. 9, 2014

(54) STRUCTURE OF FRONT PORTION OF VEHICLE BODY

(71) Applicant: Mazda Motor Corporation, Hiroshima (JP)

(72) Inventors: Hiroaki Takeshita, Aki-gun (JP); Ippei Kuroda, Hiroshima (JP); Shun Teshigahara, Hiroshima (JP); Fumitaka Andou, Hatsukaichi (JP); Norio Asano, Hiroshima (JP); Shohei Yoshida, Hatsukaichi (JP); Kazuki Yamauchi, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/137,214

(22) Filed: Dec. 20, 2013

(65) Prior Publication Data
US 2014/0183833 A1   Jul. 3, 2014

(30) Foreign Application Priority Data

Dec. 28, 2012   (JP) ................................. 2012-288037

(51) Int. Cl.
*B62D 21/11*   (2006.01)

(52) U.S. Cl.
USPC .................................................. 280/124.109

(58) Field of Classification Search
USPC ........................... 280/124.109; 180/311, 312; 296/187.09, 193.09, 204, 203.02
See application file for complete search history.

(56) References Cited

U.S. PATENT DOCUMENTS

| | | | |
|---|---|---|---|
| 6,808,229 B2 * | 10/2004 | Yamaguchi | ................... 296/204 |
| 8,398,154 B1 * | 3/2013 | Nusier et al. | ................ 296/187.1 |
| 8,480,102 B2 * | 7/2013 | Yamada et al. | ......... 280/124.109 |
| 2005/0212334 A1 | 9/2005 | Murata et al. | |

FOREIGN PATENT DOCUMENTS

JP   2005-271811 A   10/2005

* cited by examiner

*Primary Examiner* — Faye M. Fleming
(74) *Attorney, Agent, or Firm* — Studebaker & Brackett PC (57) ABSTRACT

Front side frames 1 of a vehicle are each vertically connected through a corresponding one of joint members 7 to a cross member 2 configured to support a suspension arm below the front side frame 1. The joint members 7 are each coupled to a back end of a corresponding one of extension frames 4. This allows the front side frames 1 and the cross member 2 to share the load experienced by the extension frames 4 in a frontal collision of the vehicle.

4 Claims, 13 Drawing Sheets

STRUCTURE OF FRONT PORTION OF VEHICLE BODY

CROSS-REFERENCE TO RELATED APPLICATIONS

This application claims priority to Japanese Patent Application No. 2013-288037 filed on Dec. 28, 2012, the entire disclosure of which is incorporated by reference herein.

BACKGROUND

The present disclosure relates to structures of front portions of vehicle bodies.

Vehicles each have a vehicle body having a front portion structure that is deformed into a predetermined configuration to absorb shock caused by a frontal collision of the vehicle. It is preferable that when shock caused by the frontal collision is absorbed as described above, the deceleration of the vehicle body (the load experienced by the vehicle body) reaches its peak during the early stages of the collision, and then the front portion structure is deformed such that the deceleration is relatively low and fixed. The reason for this is that the peak during the early stages induces forward inertial forces on occupants, thereby increasing the tension of each of seatbelts and reducing the distance between an air bag and a corresponding one of the occupants. In other words, a small amount of air bag deployment merely needs to be set, and therefore the air bag is less likely to injure the corresponding one of the occupants.

The shape of each of front side frames has conventionally been designed as described in Japanese Unexamined Patent Publication No. 2005-271811 to provide the above-described deceleration characteristics. Not only the shape has been designed as above, but also reinforcements have been locally placed on the front side frame, or a deformable bead has been provided on the front side frame to extend along the vehicle width, thereby changing the rigidity of a part of the front side frame in a front-to-rear direction of the vehicle.

Incidentally, one of significant measures to address needs for an improved behavior of a vehicle when driven and enhanced fuel efficiency is to reduce the vehicle body weight. However, such a countermeasure in which front side frames absorb shock as described above complicates the structure of each of the front side frames, for example, to inevitably increase the weight of the frame itself due to curving of the frame, or inevitably increase the frame weight due to the addition of the reinforcements to the frame.

In this connection, inventors of the present disclosure conducted studies to obtain intended shock absorption characteristics by cooperation of a front side frame and another extension frame located under the front side frame and extending forward. In other words, when the extension frame is utilized for the formation of the peak during the early stages, the front side frame merely needs to serve to absorb shock through axial compression, and the front side frame does not need to form a complicated shape. This helps reduce the weight of the front side frame.

Japanese Unexamined Patent Publication No. 2005-271811 describes that a suspension cross member below the front side frames include side frames extending forward of the vehicle, and the side frames are deformed to absorb shock caused by a frontal collision of the vehicle. This provision of the side frames is a countermeasure against a collision between the vehicle and an obstacle at a low level, which cannot be addressed using the front side frames, and does not allow the front side frames and the side frames below the front side frames to cooperate to obtain intended shock absorption characteristics.

When the extension frame is given a strength high enough to be resistant to a light collision to utilize the extension frame for the formation of the peak during the early stages, the extension frame is tightened against the collision load at the time of a light collision. Thus, the entire suspension cross member to which a collision load is transferred through the extension frame, and an entire member for supporting the suspension cross member need to be increased in rigidity, or the suspension cross member and the member need to be partially reinforced, resulting in the increased vehicle weight.

When, as described above, the front side frame and the extension frame cooperate to absorb shock, the extension frame needs to efficiently contribute to the formation of the peak during the early stages, and the front side frame needs to be axially compressed with reliability without being affected by the extension frame.

In short, it is an object of the present disclosure to reduce the collision load transferred through an extension frame to, for example, a suspension cross member at the time of a light collision.

It is another object of the present disclosure to obtain intended shock absorption characteristics by cooperation of a front side frame and the extension frame.

It is still another object of the present disclosure to obtain the intended shock absorption characteristics by cooperation of the front side frame and the extension frame to facilitate reducing the vehicle weight.

Yet other objects of the present disclosure are to allow the extension frame to ensure the formation of the peak during the early stages by the cooperation, and to ensure axial compression of the front side frame.

SUMMARY

In the present disclosure, a load is transferred from the extension frame to both the front side frame and the suspension cross member.

A structure of a front portion of a vehicle body of a vehicle presented here includes: right and left front side frames respectively provided on right and left sides of a front portion of the vehicle, and projecting forward of a cabin; a suspension cross member disposed below the right and left front side frames to support right and left suspension lower arms; right and left joint members through which the right and left front side frames are vertically connected to front portions of right and left portions of the suspension cross member, respectively; and right and left extension frames each having a back end portion coupled to a vertically middle portion of a corresponding one of the right and left joint members, and respectively located below the right and left front side frames to extend forward to near front end portions of the right and left front side frames.

According to the structure, the front side frames and the extension frames cooperate to experience a collision load in a frontal collision of the vehicle. Thus, when the extension frames are tightened against the collision load from the front, the load is transferred through the joint members separately to the front side frames and the suspension cross member. In other words, the collision load is not concentrated on only the suspension cross member. This eliminates the need for increasing the thicknesses of the suspension cross member and other elements to increase the rigidities thereof, and the need for taking a rigorous measure against shock, such as addition of reinforcements. This elimination helps reduce the vehicle weight.

In a preferable embodiment, each of the front side frames is connected to one of the extension frames below the front side frame only at their front end portions, positions of centers of cross sections of each of the extension frames orthogonal to a front-to-rear direction of the vehicle vary along a direction orthogonal to the front-to-rear direction of the vehicle, and a distance, along a vehicle width, from an outermost one of the centers of the cross sections of the extension frame across an entire length of the extension frame to an innermost one of the centers of the cross sections is greater than a vertical distance from an uppermost one of the centers of the cross sections to a lowermost one of the centers of the cross sections.

With the embodiment, the extension frames are tightened against the collision load during the early stages of the frontal collision of the vehicle. This increases the load experienced by each of the extension frames until the extension frame is buckled. Then, the buckling of each of the extension frames due to variations in the positions of the centers of the cross sections decreases the load experienced by the extension frame. Therefore, so to speak, the load experienced by the extension frames is added over the load experienced by the front side frames, and thus, the deceleration of the vehicle reaches its peak during the early stages.

As such, the extension frames help the formation of the peak during the early stages, and the front side frames themselves do not need to create the peak during the early stages. The front side frames merely need to be deformed such that the vehicle body decelerates at, e.g., a generally fixed deceleration. In other words, the front side frames merely need to extend forward of the cabin in a generally straight line so as to be deformed by axial compression. This eliminates the need for complicating the shape of each of the front side frames, and thus helps reduce the weight of the vehicle.

The connection between each of the front side frames and one of the extension frames below the front side frame only at their front end portions prevents a middle portion of each of the front side frames from being locked to (interfering with) a middle portion of a corresponding one of the extension frames in a frontal collision of the vehicle. This helps obtain intended shock absorption characteristics by cooperation of both the front side frames and the extension frames.

Since the distance, along the vehicle width, from the outermost one of the centers of the cross sections of the extension frame to the innermost one of the centers of the cross sections is greater than a vertical distance from the uppermost one of the centers of the cross sections to the lowermost one of the centers of the cross sections, this facilitates buckling the extension frames along the vehicle width. This facilitation prevents the buckling in the extension frames from producing a vertical moment on the front side frames. This ensures axial compressive deformation of the front side frames to help obtain intended shock absorption characteristics.

In addition, the centers of the cross sections vary as described above to buckle the extension frames. This eliminates the need for significantly changing, for example, the cross-sectional shape of a portion of each of the extension frames. This elimination facilitates designing the extension frames.

When the right and left extension frames experience a collision load, both the right and left extension frames are preferably buckled inwardly along the vehicle width, or outwardly along the vehicle width.

In a preferable embodiment, the structure further includes: right and left crush cans provided at front ends of the right and left front side frames, respectively; a bumper beam having both end portions connected to the right and left crush cans; and right and left crush cans provided at front ends of the right and left extension frames, respectively. Positions of the front ends of the right and left front side frames and positions of front ends of the right and left extension frames are determined such that in a frontal collision of the vehicle, the right and left front side frames and the right and left extension frames each start being deformed in synchronization after a corresponding one of the right and left crush cans at the front ends of the right and left front side frames and a corresponding one of the right and left crush cans at the front ends of the right and left extension frames have been crushed.

With this embodiment, in the frontal collision of the vehicle, after one of the crush cans at the front ends of the front side frames and a corresponding one of the crush cans at the front ends of the extension frames have been crushed, a corresponding one of the front side frames and a corresponding one of the extension frames start being deformed in synchronization with each other. This helps obtain intended shock absorption characteristics by cooperation of both the front side frames and the extension frames.

The positions of the front ends of the right and left front side frames are preferably shifted from the positions of the front ends of the right and left extension frames toward a back of the vehicle by a length corresponding to a thickness of the bumper beam along the front-to-rear direction. Thus, after one of the crush cans at the front ends of the front side frames and a corresponding one of the crush cans at the front ends of the extension frames have been crushed, a corresponding one of the front side frames and a corresponding one of the extension frames start being deformed in synchronization with each other.

The front end of each of the right and left front side frames and the front end of a corresponding one of the right and left extension frames preferably each include a plate member having a horizontal portion, and the horizontal portions of the plate members are preferably vertically connected together. Thus, when the suspension cross member including suspensions is assembled to the front side frames from below, the horizontal portions of both the plate members are vertically aligned with each other, thereby positioning the height of the suspension cross member. Furthermore, the horizontal portions of both the plate members can be vertically fastened to each other. This facilitates the assembly.

The front side frames preferably each include an axial compressive deformation portion located forward of a corresponding one of the joint members and deformed by axial compression in a frontal collision of the vehicle to absorb a collision load. This prevents the joint members from hindering smooth axial compressive deformation of the front side frames. This prevention helps absorb shock in the frontal collision.

DETAILED DESCRIPTION

An embodiment of the present disclosure will be described hereinafter with reference to the drawings. The following embodiment is merely a preferred example in nature, and is not intended to limit the scope, applications, and use of the invention.

<Schematic Configuration of Structure of Front Portion of Vehicle Body>

In a structure of a front portion of a vehicle body of a vehicle illustrated in FIG. 1, the reference character 1 denotes front side frames located to both the right and left of the front portion of the vehicle, and the reference character 2 denotes a suspension cross member disposed below the front side frames 1. The suspension cross member 2 include extension frames 4 each provided below a corresponding one of the right and left front side frames 1 to extend forward of a cabin (not shown).

Figure 2:
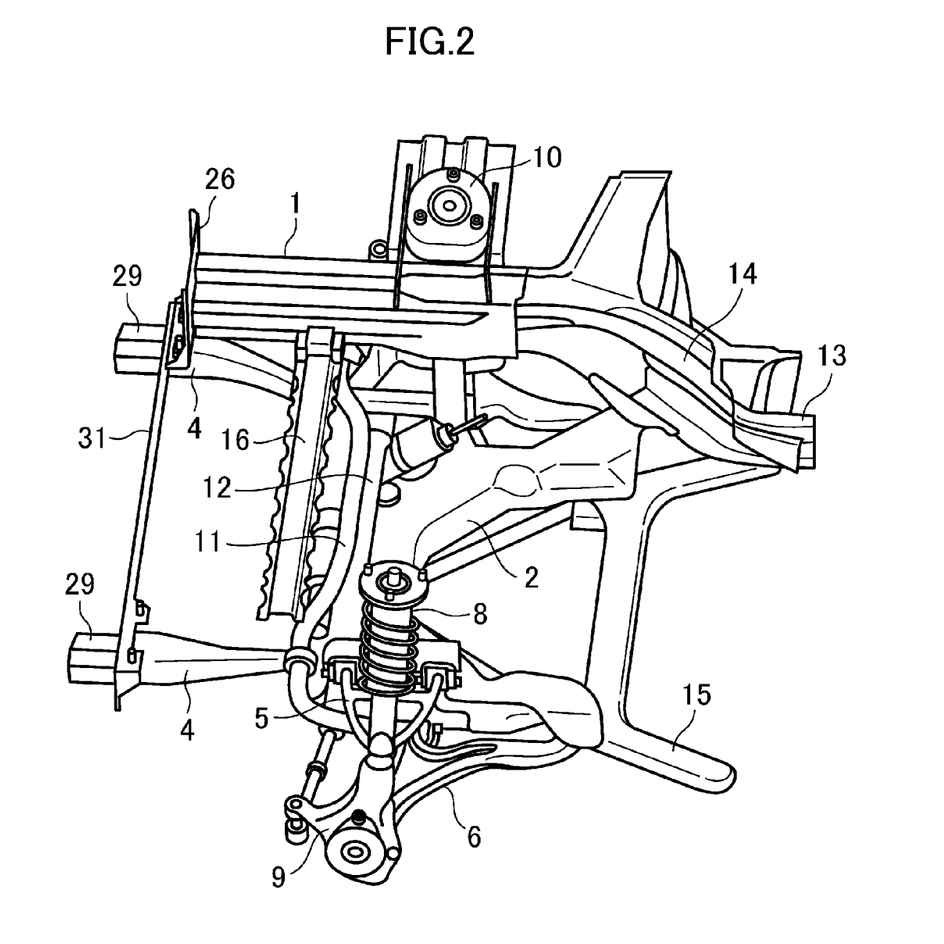
FIG. 2 is a partially omitted perspective view illustrating the structure of the front portion of the vehicle body to which the suspensions and other elements are assembled.

As illustrated in FIG. 2, in this embodiment, a double wishbone suspension configured to support tires between upper arms 5 and lower arms 6 is employed. The upper arms 5 are each pivoted to a below-described joint member 7 connecting a corresponding one of the front side frames 1 to the suspension cross member 2. The lower arms 6 are each pivoted to the suspension cross member 2 and the joint member 7. In FIG. 2, the reference character 8 denotes spring-integrated dampers each connecting a knuckle 9 to a suspension tower 10, the reference character 11 denotes a stabilizer, the reference character 12 denotes a power steering gear unit, the reference character 13 denotes floor frames each connected to a back end of a corresponding one of the front side frames 1, the reference character 14 denotes frames each connecting a corresponding one of the front side frames 1 to a center tunnel of a vehicle floor, the reference character 15 denotes a brace, and the reference character 16 denotes a cross member connecting the right and left front side frames 1 together.

Figure 3:
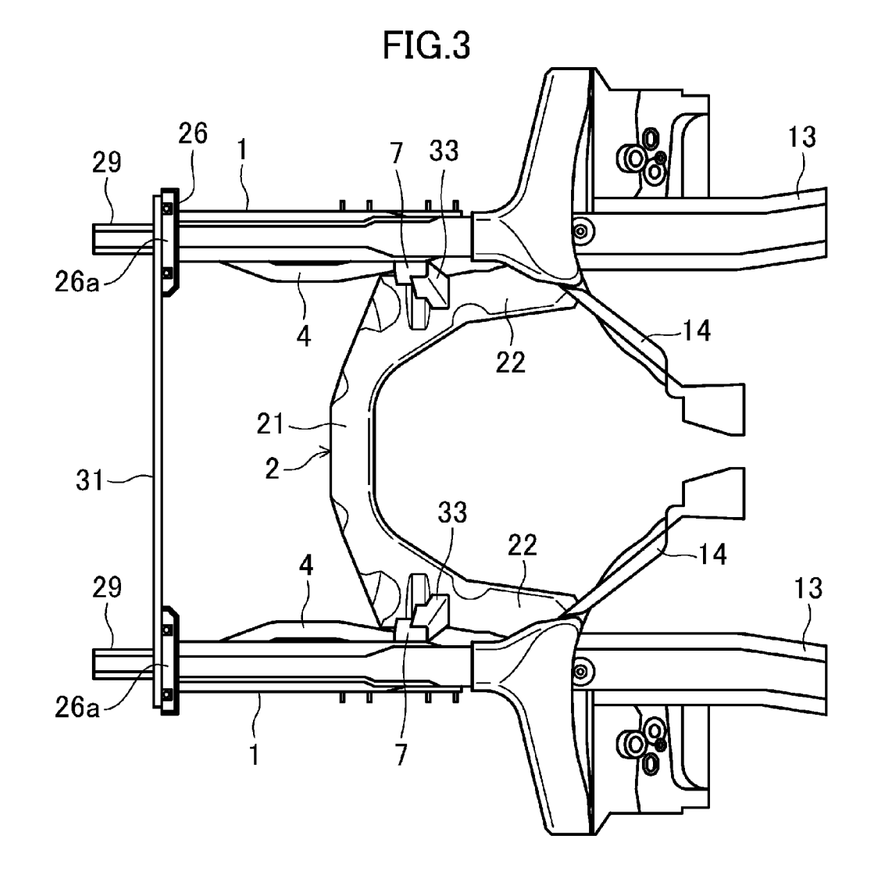
FIG. 3 is a plan view illustrating the structure of the front portion of the vehicle body.
Figure 4:
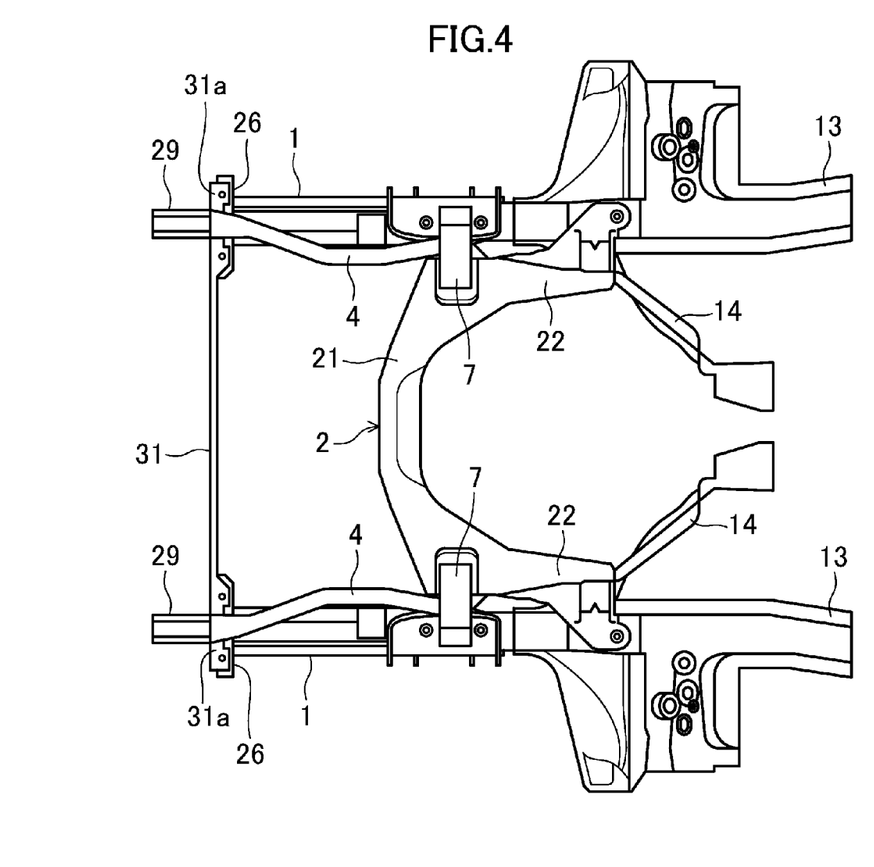
FIG. 4 is a bottom view illustrating the structure of the front portion of the vehicle body.

As illustrated in FIG. 3 (plan view) and FIG. 4 (bottom view), the suspension cross member 2 is horseshoe-shaped, and has a lateral portion 21 extending along the vehicle width, and longitudinal portions 22 extending backward of the vehicle body continuously with both end portions of the lateral portion 21.

Returning to FIG. 1, the joint member 7 includes an upper member 23 coupled to a lower surface of a corresponding one of the front side frames 1 and extending along the front-to-rear direction of the vehicle, and a lower member 24 extending downward from a central portion of the upper member 23 and having a lower end portion coupled to a corresponding one of side surfaces of the suspension cross member 2. Both front and back end portions of the upper member 23 each include a pivoting portion 23a to which a corresponding one of the upper arms 5 is pivoted. A back end portion of each of the longitudinal portions 22 of the suspension cross member 2 and a lower end portion of a corresponding one of the lower members 24 include pivoting portions 22a and 24a, respectively, to which a corresponding one of the lower arms 6 is pivoted.

<Configuration for Absorbing Shock Caused by Frontal Collision>

—Front Side Frames 1—

Figure 1:
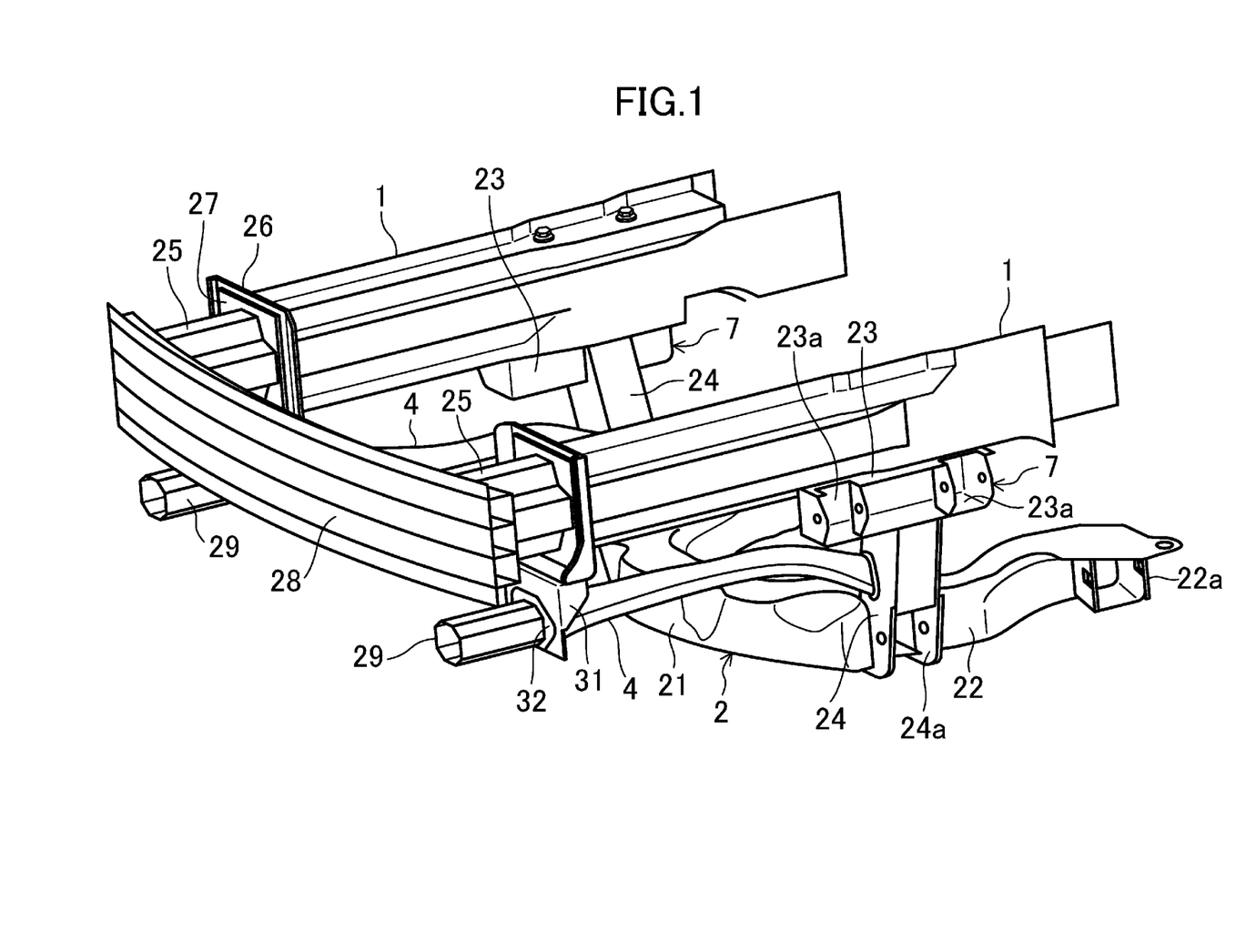
FIG. 1 is a perspective view illustrating a structure of a front portion of a vehicle (to which suspensions and other elements are not assembled).

As illustrated in FIG. 1, the right and left front side frames 1 protrude forward of the cabin in a generally straight line, and each have a front end including a crush can 25. Specifically, the front end of each of the front side frames 1 includes a set plate 26, and the set plate 26 is coupled to a flange 27 at the back end of a corresponding one of the crush cans 25. The right and left crush cans 25 are respectively connected to both end portions of a slightly forwardly curved bumper beam 28.

A portion of each of the front side frames 1 extending from the front end thereof to the vicinity of a back end portion thereof in a straight line has a cross section being orthogonal to the front-to-rear direction of the vehicle and having a generally cross-shaped concave polygonal shape, and a portion of the front side frame 1 backward of the portion that is concave polygonal in cross section has a rectangular cross section. The crush cans 25 also have a generally cross-shaped concave polygonal cross section.

The joint members 7 each vertically connect a portion of a corresponding one of the front side frames 1 transitioning from a back end portion of the portion that is concave polygonal in cross section to the portion that is rectangular in cross section and a front end portion of a corresponding one of the longitudinal portions 22 of the suspension cross member 2 together.

In this embodiment, portions of the front side frames 1 located forward of the joint members 7 and having a concave polygonal cross section form axial compressive deformation portions deformed by axial compression in a frontal collision of the vehicle to absorb collision loads. Since the crush cans 25 also have a generally cross-shaped concave polygonal cross section as described above, they are deformed by axial compression in a frontal collision of the vehicle to absorb collision loads.

—Extension Frames 4—

The extension frames 4 extend along the front side frames 1 in the front-to-rear direction of the vehicle, and each have a back end coupled to a front surface of the lower member 24 of a corresponding one of the joint members 7. A front end of each of the extension frames 4 includes a crush can 29. Specifically, the front ends of the right and left extension frames 4 are connected together through a connection plate 31 extending along the vehicle width, and a flange 32 at a back end of each of the crush cans 29 is coupled to a front surface of a corresponding one of both end portions of the connection plate 31.

Figure 5:
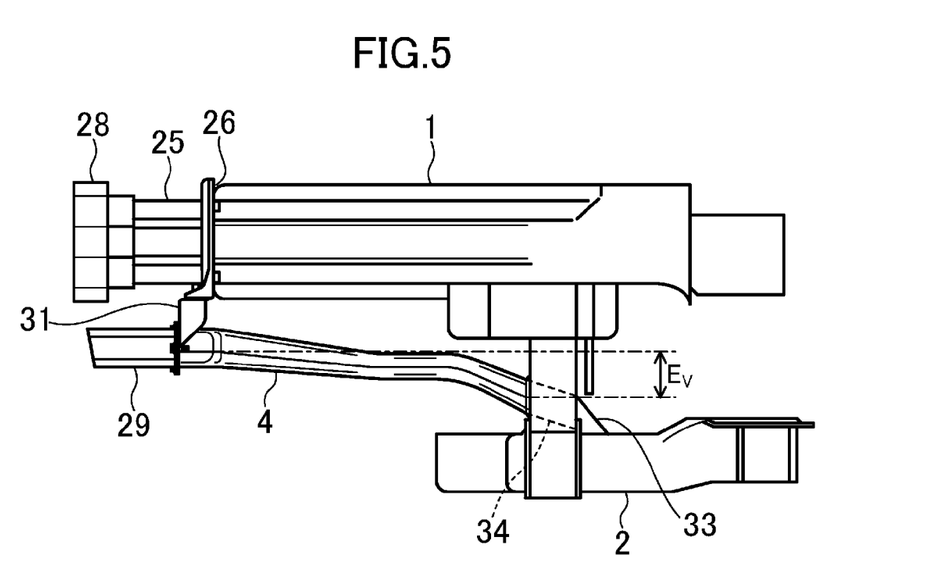
FIG. 5 is a side view illustrating a principal portion of the structure of the front portion of the vehicle body.
Figure 6:
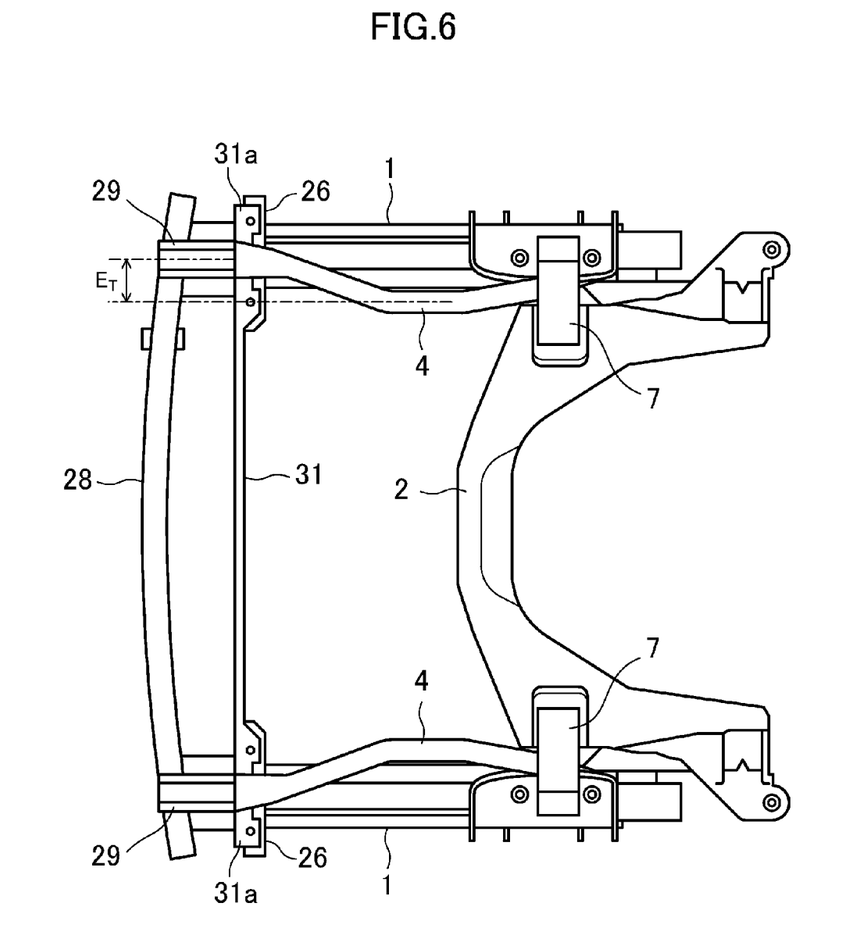
FIG. 6 is a bottom view illustrating the principal portion of the structure of the front portion of the vehicle body.

As illustrated in FIGS. 5 and 6, an axis connecting the centers of cross sections of each of the extension frames 4 orthogonal to the front-to-rear direction of the vehicle does not extend along the front-to-rear direction of the vehicle in a straight line, and the centers vary along a direction orthogonal to the front-to-rear direction of the vehicle. Specifically, the axis of the extension frame 4 extends gradually downward from the front end thereof backward, a portion of the axis corresponding to a back end portion of the extension frame 4 further extends slightly more significantly downward, and a portion of the axis corresponding to a middle portion of the extension frame 4 is located inward of the other portions of the axis along the vehicle width. Thus, the distance $E_T$, along the vehicle width, from an outermost portion of the entire longitudinal axis of the extension frame 4 to an innermost portion thereof is greater than the vertical distance $E_V$ from an uppermost portion of the axis to a lowermost portion thereof. When, as such, the distance $E_T$ is determined to be greater than the distance $E_V$, this facilitates buckling (bending) the extension frame 4 along the vehicle width in a frontal collision.

A portion of the extension frame 4 except a front end portion thereof, i.e., a portion thereof located backward of the front end portion thereof and having a length of greater than or equal to 90% of the entire length of the extension frame 4, has a vertically long cross-sectional shape. Such a vertically long cross-sectional shape ensures that the extension frame 4 is bent along the vehicle width.

In this embodiment, as described above, the right and left extension frames 4 are both curved inwardly along the vehicle width, and thus are buckled inwardly along the vehicle width in a frontal collision to be mirror images of each other.

The crush can 29 at the front end of each of the extension frames 4 has an octagonal cross section, and is deformed by axial compression in a frontal collision of the vehicle to absorb collision loads.

As illustrated in FIG. 5, a corner between a back surface of an upper portion of the lower member 24 of each of the joint members 7 and an upper surface of a corresponding one of the longitudinal portions 22 of the suspension cross member 2 includes a gusset 33 to allow the suspension cross member 2 to support the backward falling load applied to the lower member 24 by the tightening of a corresponding one of the extension frames 4 in a frontal collision. An upper portion of the lower member 24 has a vertically extending closed section structure, and the interior of the closed section structure includes a reinforcing member 34 acting as a bridge between the corresponding one of the extension frames 4 and the gusset 33 to easily transfer a collision load to the gusset 33.

—Relationship Between Front Side Frames 1 and Extension Frames 4—

Figure 7:
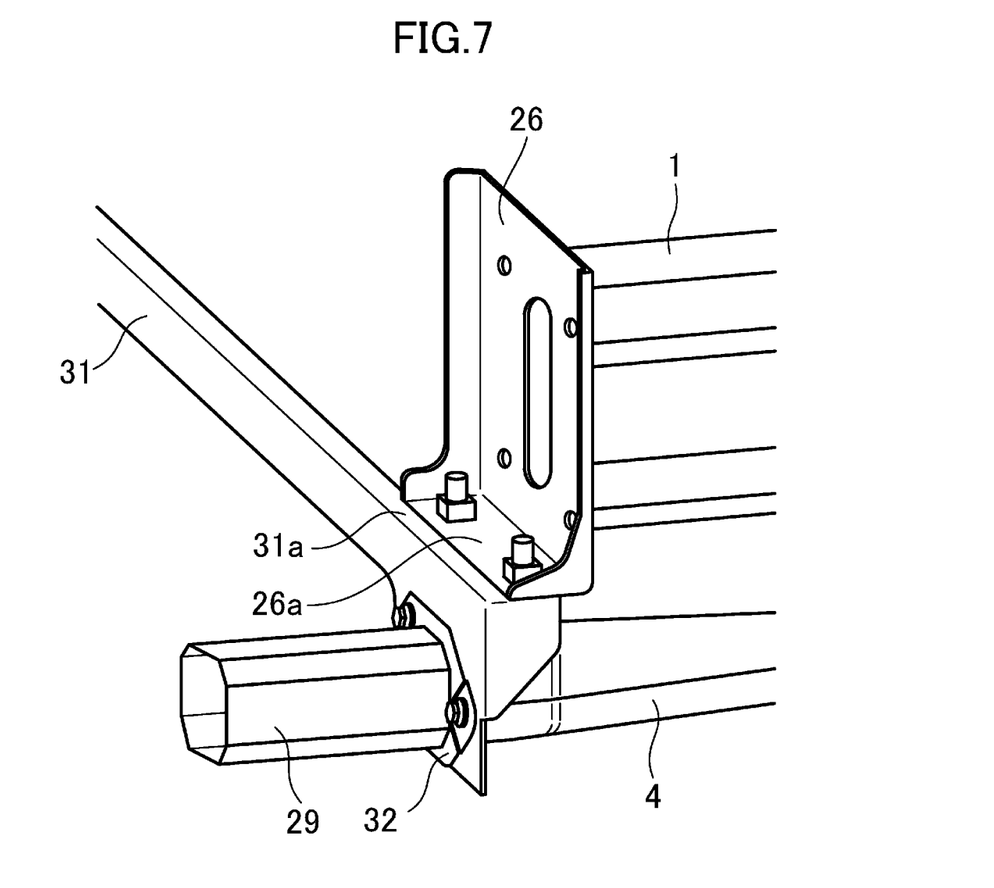
FIG. 7 is a perspective view illustrating a joint between a front end of a front side frame and a front end of an extension frame.
Figure 8:
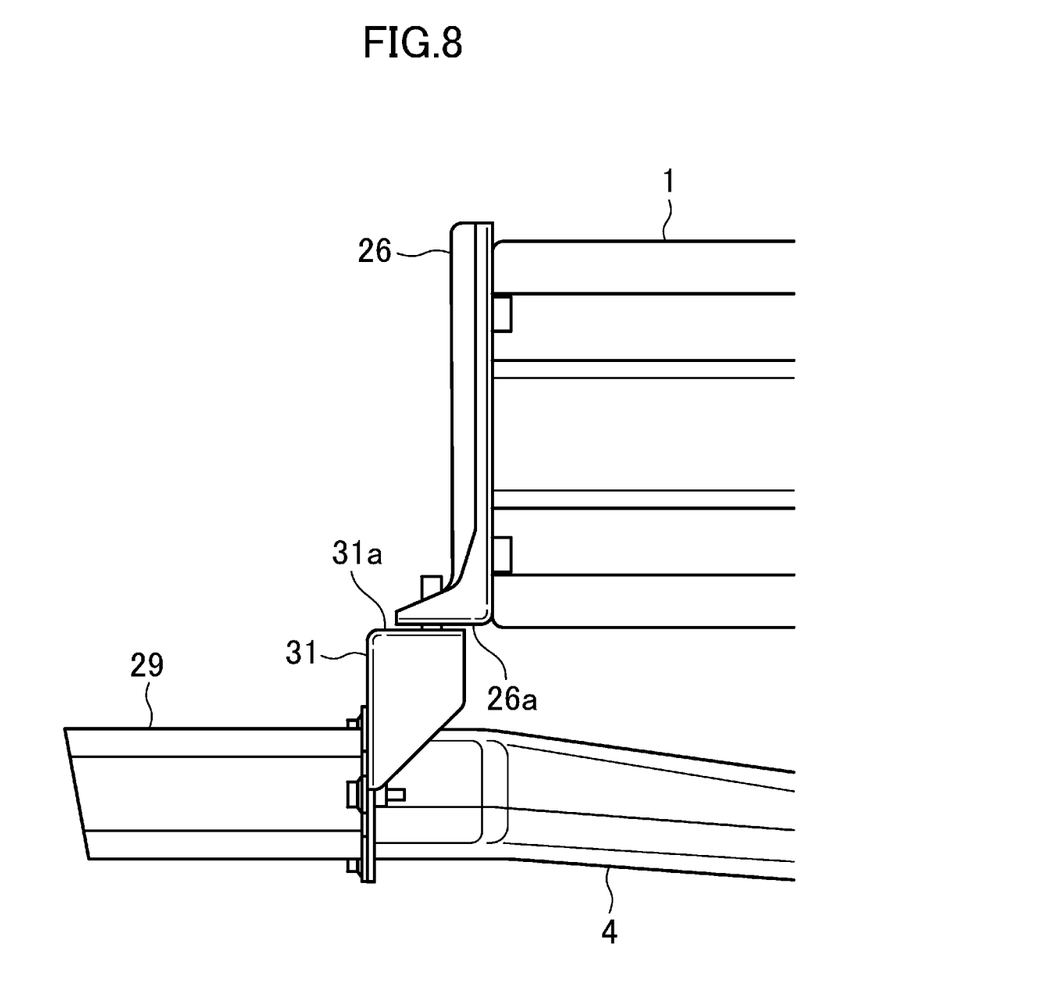
FIG. 8 is a side view illustrating the joint.

As illustrated in FIGS. 7 and 8, the front end of each of the front side frames 1 and the front end of a corresponding one of the extension frames 4 are connected together through the set plate 26 at the front end of the front side frame 1 and the connection plate 31 at the front end of the corresponding one of the extension frames 4. Specifically, the set plate 26 has a horizontal portion 26a projecting forward from its lower end. In contrast, the connection plate 31 has a horizontal portion 31a projecting backward from its upper end. The lower end horizontal portion 26a of the set plate 26 and the upper end horizontal portion 31a of the connection plate 31 are vertically aligned with each other, and are vertically fastened to each other using screw members.

The state where the horizontal portion 26a projecting forward from the set plate 26 at the front end of each of the front side frames 1 and the horizontal portion 31a projecting forward from the connection plate 31 at the front end of the corresponding one of the extension frames 4 are connected together means that the front end of the front side frame 1 and the front end of the corresponding one of the extension frames 4 are shifted away from each other along the front-to-rear direction. The amount of the front ends shifted away from each other along the front-to-rear direction is set at an amount corresponding to substantially the thickness of the bumper beam 28 in the front-to-rear direction. Specifically, the position of the front end of the front side frame 1 and the position of the front end of the corresponding one of the extension frames 4 are shifted away from each other along the front-to-rear direction such that in a frontal collision of the vehicle, after the crush cans 25 and 29 have been crushed, the front side frame 1 and the corresponding one of the extension frames 4 start being deformed by a collision load arising from the frontal collision in synchronization with each other.

Here, each of the front side frames 1 and a corresponding one of the extension frames 4 are connected together only at two points, i.e., the front end of the corresponding one of the extension frames 4 (through the set plate 26 and the connection plate 31) and the back end thereof (through the joint member 7), and are not connected together at other points.

—Shock Absorption in Vehicle Frontal Collision—

Figure 9:
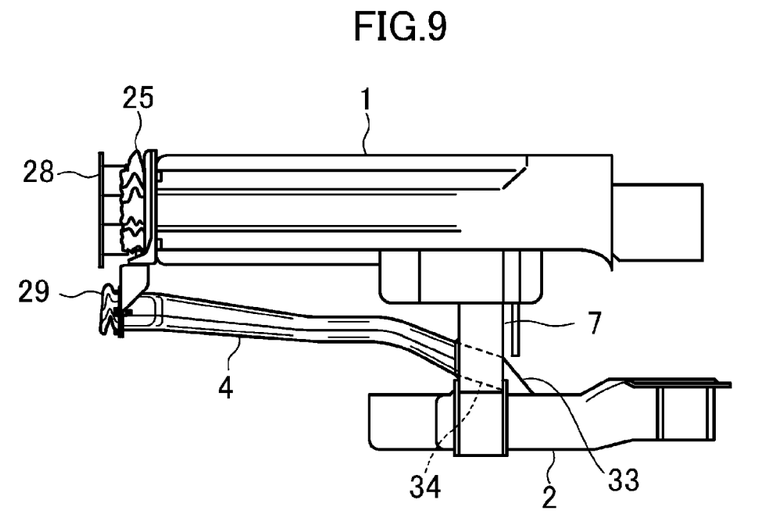
FIG. 9 is a side view illustrating the state of the principal portion of the structure of the front portion of the vehicle body during the early stages of a frontal collision.
Figure 10:
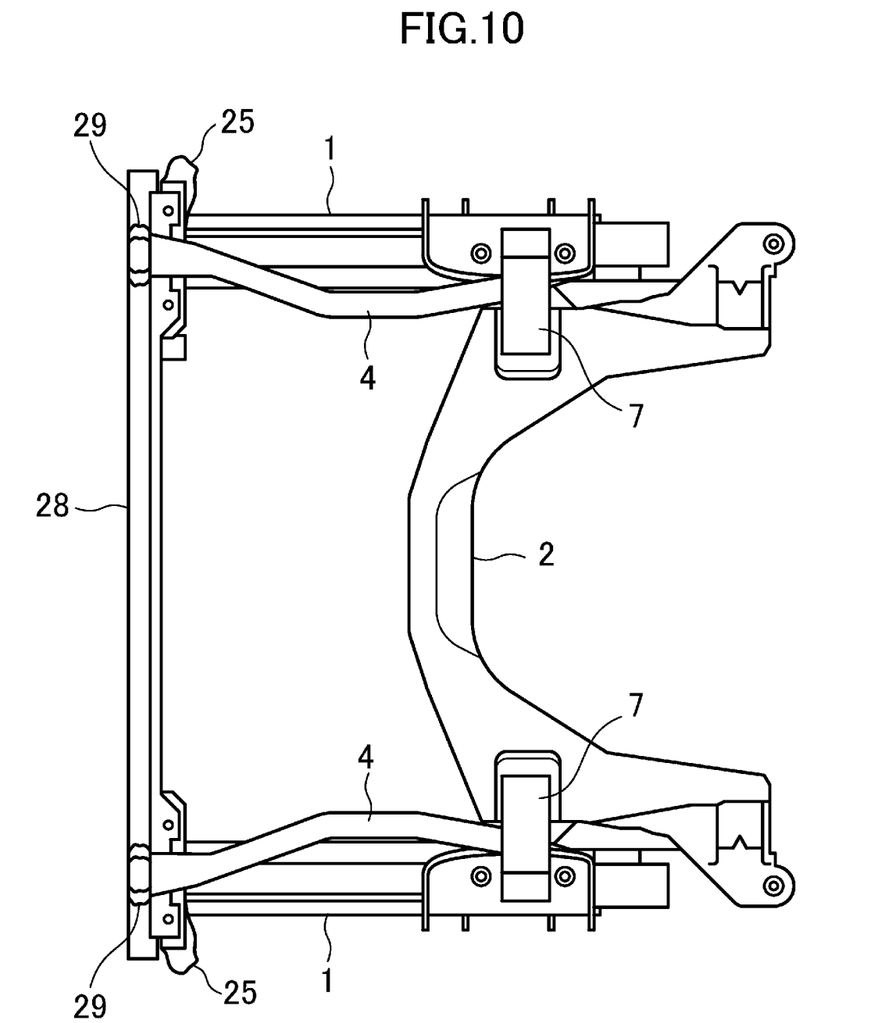
FIG. 10 is a bottom view illustrating the state of the principal portion of the structure of the front portion of the vehicle body during the early stages of the frontal collision.

FIGS. 5 and 6 illustrate the state of the structure of the front portion of the vehicle body before a frontal collision of the vehicle. When the vehicle collides with, for example, a wall head-on, the crush cans 25 and 29 are first crushed as illustrated in FIGS. 9 and 10. While the bumper beam 28 is hardly crushed because of its high rigidity, it is flattened, for example, as illustrated in FIG. 10.

A light collision causes the crush cans 25 and 29 to be crushed such that the crush cans 25 and 29 absorb shock. This shock absorption prevents the front side frames 1 and the extension frames 4 from being deformed. The extension frames 4 are tightened in the light collision to transfer a collision load through the extension frames 4 to the joint members 7. However, the collision load is transferred through the joint members 7 separately to the front side frames 1 and the suspension cross member 2. In other words, the collision load is not concentrated on only either the front side frames 1 or the suspension cross member 2. This eliminates the need for increasing the thicknesses of the suspension cross member and other elements to increase the rigidities thereof, and the need for taking a rigorous measure against shock, such as addition of reinforcements. This elimination helps reduce the vehicle weight.

When the vehicle relatively strongly collides with, for example, a wall, the crush cans 25 and 29 are crushed, and the front side frames 1 and the extension frames 4 are deformed. As previously described, the position of the front end of each of the front side frames 1 and the position of the front end of a corresponding one of the extension frames 4 are shifted away from each other along the front-to-rear direction, and therefore, after the crush cans 25 and 29 have been crushed, the front side frame 1 and the corresponding one of the extension frames 4 start being deformed in synchronization with each other. In other words, the front side frame 1 and the corresponding one of the extension frames 4 cooperate to be subjected to a collision load.

Figure 11:
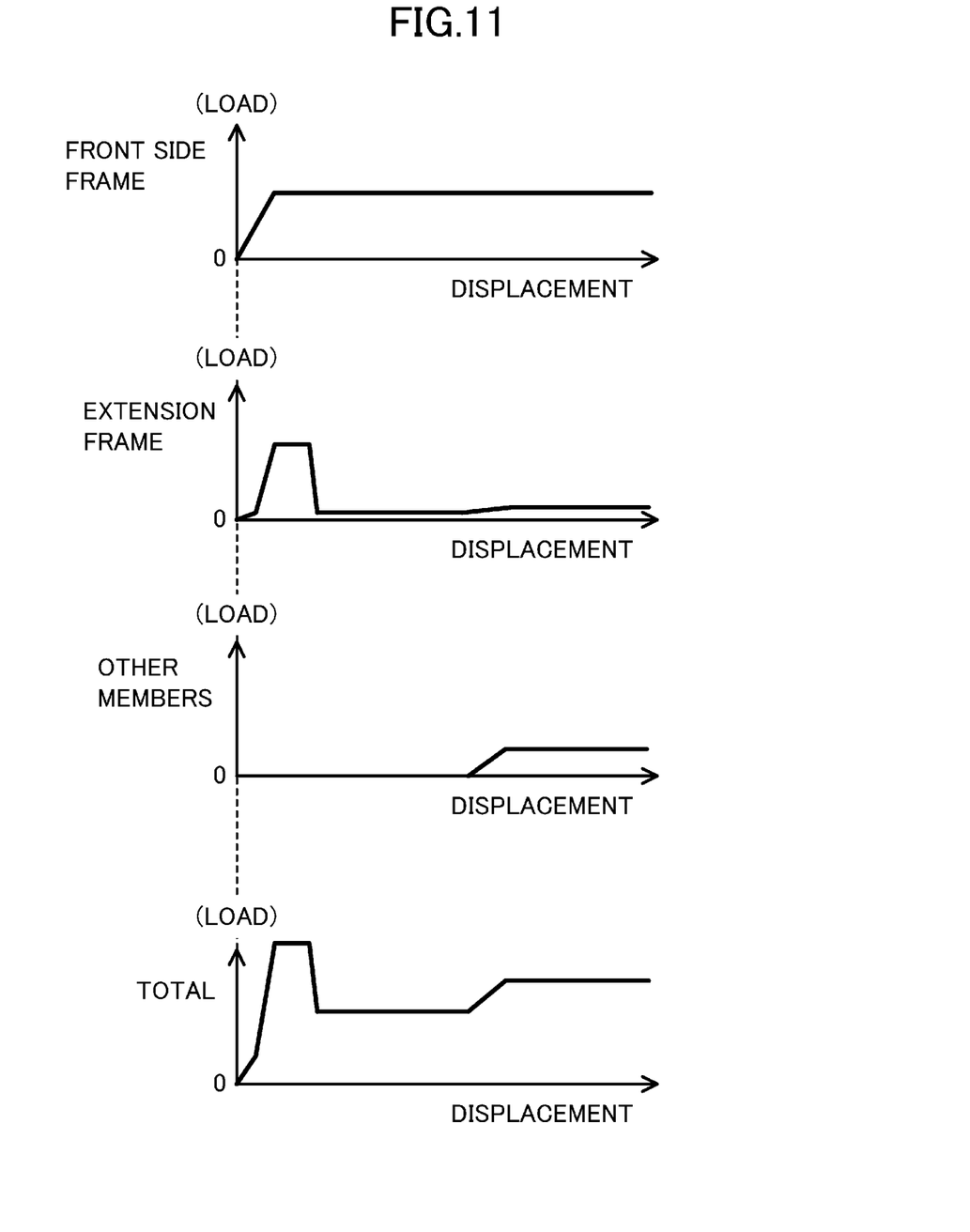
FIG. 11 is a graph schematically illustrating load-displacement characteristics during the frontal collision according to the present disclosure.

As described above, the front side frames 1 each have a concave polygonal portion that extends from its front end backward in a straight line and has a generally cross-shaped cross-section. Thus, as illustrated in FIG. 11, which schematically illustrates load-displacement characteristics, the front side frames 1 are deformed by axial compression to absorb the collision load in the frontal collision without causing a significant load fluctuation.

In contrast, as described above, the extension frames 4 are buckled under the collision load. Thus, as illustrated in FIG. 11, which schematically illustrates load-displacement characteristics, the extension frames 4 are tightened against the collision load during the early stages of subjection to the collision load. This tightening increases the load absorbed by each of the extension frames 4 until the extension frame 4 is buckled for the first time, and then the buckling in the extension frames 4 sharply decreases the load.

Therefore, when the front side frames 1 and the extension frames 4 start being deformed due to the collision load in synchronization with each other, the load experienced by the front side frames 1 is added over the load experienced by the extension frames 4, and consequently the total load reaches its peak during the early stages. After the extension frames 4 have been buckled, the front side frames 1 are deformed by axial compression, and thus, absorption of the collision load proceeds. This allows the deceleration of the vehicle body to be generally fixed. However, during the late stages of the collision, a fender and other members are deformed to absorb the collision load, and the load absorbed by the members slightly increase.

Figure 12:
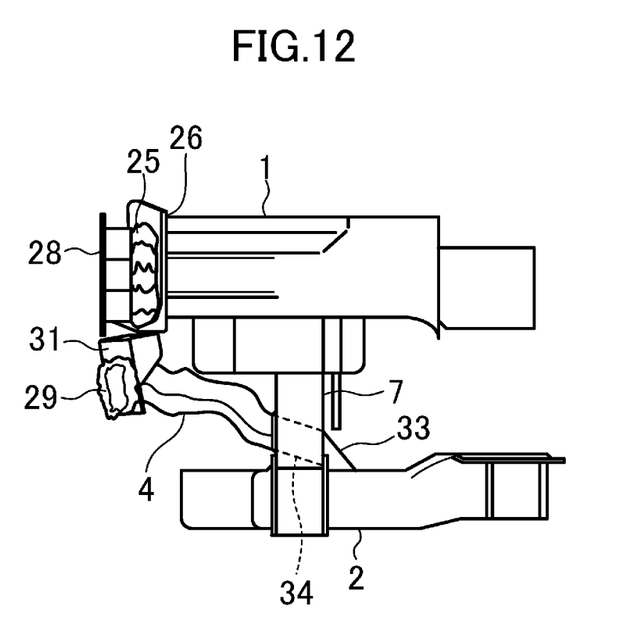
FIG. 12 is a side view illustrating the state where a frontal collision has caused deformation of the structure of the front portion of the vehicle body to proceed.
Figure 13:
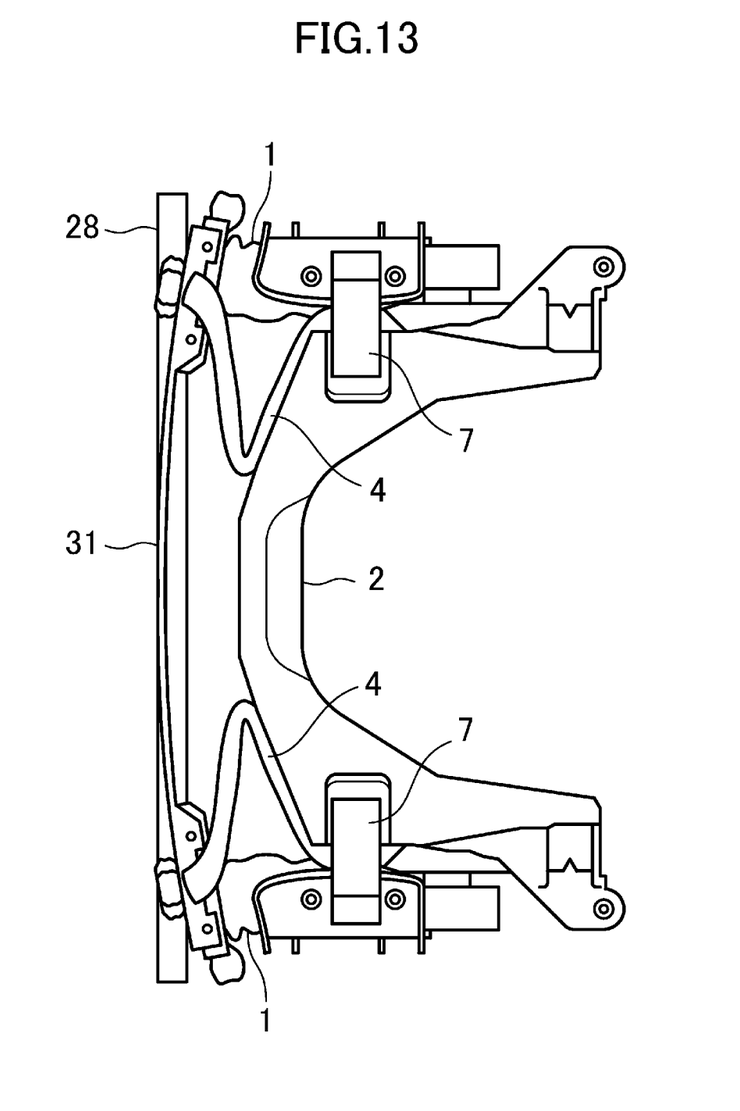
FIG. 13 is a bottom view illustrating the state where the frontal collision has caused the deformation of the structure of the front portion of the vehicle body to proceed.

As described above, each of the front side frames 1 and a corresponding one of the extension frames 4 are connected together at only two points, i.e., the front and back ends of the corresponding one of the extension frames 4. This can prevent the extension frames 4 from hindering axial compressive deformation of the front side frames 1, or prevent the front side frames 1 from hindering the buckling in the extension frames 4. As illustrated in FIGS. 12 and 13, the right and left extension frames 4 are buckled inwardly along the vehicle width to be mirror images of each other. When the extension frames 4 are buckled, a moment is not produced on each of the front side frames 1 along a vertical direction or along the vehicle width. This ensures axial compressive deformation of the front side frame 1.

In the assembly of a vehicle, suspensions and the joint members 7 are assembled to the suspension cross member 2, and in this state, the assembled parts are lifted from below the vehicle body so as to be assembled to the front side frames 1. In this case, the horizontal portion 26a of the set plate 26 near each of the front side frames 1 and the horizontal portion 31a of the connection plate 31 near a corresponding one of the extension frames 4 are vertically aligned with each other, thereby positioning the height of the suspension cross member 2. Furthermore, the horizontal portion 26a of the set plate 26 and the horizontal portion 31a of the connection plate 31 can be vertically fastened to each other. This facilitates the assembly.

Both of the right and left extension frames 4 may be buckled outward along the vehicle width. For example, the cross-sectional shape of each of the front side frames 1 and the crush cans 25 and 29 and the shape of the suspension cross member 2 are not limited to those in the embodiment.

What is claimed is:

1. A structure of a front portion of a vehicle body of a vehicle, comprising:
   right and left front side frames respectively provided on right and left sides of a front portion of the vehicle, and projecting forward of a cabin;
   a suspension cross member disposed below the right and left front side frames to support right and left suspension lower arms;
   right and left joint members through which the right and left front side frames are vertically connected to front portions of right and left portions of the suspension cross member, respectively; and
   right and left extension frames each having a back end portion coupled to a vertically middle portion of a corresponding one of the right and left joint members, and respectively located below the right and left front side frames to extend forward to near front end portions of the right and left front side frames;
   right and left crush cans provided at front ends of the right and left front side frames, respectively;
   a bumper beam having both end portions connected to the right and left crush cans; and
   right and left crush cans provided at front ends of the right and left extension frames, respectively;
   wherein positions of the front ends of the right and left front side frames and positions of the front ends of the right and left extension frames are determined such that in a frontal collision of the vehicle, each of the right and left front side frames and a corresponding one of the right and left extension frames start being deformed in synchronization with each other after a corresponding one of the right and left crush cans at the front ends of the right and left front side frames and a corresponding one of the right and left crush cans at the front ends of the right and left extension frames have been crushed; and
   wherein the positions of the front ends of the right and left front side frames are shifted from the positions of the front ends of the right and left extension frames to a back of the vehicle by a length corresponding to a thickness of the bumper beam along the front-to-rear direction.

2. A structure of a front portion of a vehicle body of a vehicle, comprising:
   right and left front side frames respectively provided on right and left sides of a front portion of the vehicle, and projecting forward of a cabin;
   a suspension cross member disposed below the right and left front side frames to support right and left suspension lower arms;
   right and left joint members through which the right and left front side frames are vertically connected to front portions of right and left portions of the suspension cross member, respectively; and
   right and left extension frames each having a back end portion coupled to a vertically middle portion of a corresponding one of the right and left joint members, and respectively located below the right and left front side frames to extend forward to near front end portions of the right and left front side frames;
   right and left crush cans provided at front ends of the right and left front side frames, respectively;
   a bumper beam having both end portions connected to the right and left crush cans; and
   right and left crush cans provided at front ends of the right and left extension frames, respectively;
   wherein positions of the front ends of the right and left front side frames and positions of front ends of the right and left extension frames are determined such that in a frontal collision of the vehicle, the right and left front side frames and the right and left extension frames each start being deformed in synchronization after a corresponding one of the right and left crush cans at the front ends of the right and left front side frames and a corresponding one of the right and left crush cans at the front ends of the right and left extension frames have been crushed; and
   wherein the positions of the front ends of the right and left front side frames are shifted from the positions of the front ends of the right and left extension frames toward a back of the vehicle by a length corresponding to a thickness of the bumper beam along the front-to-rear direction.

3. The structure of claim 1, wherein
the front end of each of the right and left front side frames and the front end of a corresponding one of the right and left extension frames each include a plate member having a horizontal portion, and
the horizontal portions of the plate members are vertically connected together.

4. The structure of claim 2, wherein
the front end of each of the right and left front side frames and the front end of a corresponding one of the right and left extension frames each include a plate member having a horizontal portion, and
the horizontal portions of the plate members are vertically connected together.

\* \* \* \* \*